United States Patent [19]
Werquin et al.

[11] Patent Number: 5,536,230
[45] Date of Patent: Jul. 16, 1996

[54] COMPOSITE WORKING ROLL FOR HOT ROLLING FLAT PRODUCTS

[75] Inventors: Jean-Claude Werquin, Ronchin; Jacques Bocquet, Aulnoye, both of France

[73] Assignee: Chavanne-Ketin, Puteaux, France

[21] Appl. No.: 13,344

[22] Filed: Feb. 3, 1993

Related U.S. Application Data

[63] Continuation-in-part of Ser. No. 758,492, Sep. 5, 1991, abandoned, which is a continuation of Ser. No. 408,517, Oct. 16, 1989, abandoned.

[30] Foreign Application Priority Data

Dec. 23, 1987 [FR] France .................................. 87 18073
Feb. 4, 1992 [FR] France .................................. 92 01233

[51] Int. Cl.⁶ ..................................................... B73P 15/00
[52] U.S. Cl. ............................ 492/54; 492/58; 29/895.32
[58] Field of Search ..................... 492/54, 58; 29/895.32

[56] References Cited

U.S. PATENT DOCUMENTS

| | | |
|---|---|---|
| 4,193,823 | 3/1980 | Linne . |
| 4,484,959 | 11/1984 | Boucher et al. . |
| 4,548,653 | 10/1985 | Bocquet et al. . |
| 4,721,153 | 1/1988 | Sano et al. . |
| 4,726,417 | 2/1988 | Sano . |
| 4,771,524 | 9/1988 | Barbezat et al. . |

FOREIGN PATENT DOCUMENTS

| | | |
|---|---|---|
| 2601268 | 1/1988 | France . |
| 2625226 | 6/1989 | France . |
| 2451044 | 10/1974 | Germany . |
| 2469221 | 5/1981 | Germany . |
| 3116227 | 11/1982 | Germany . |
| 3236268 | 6/1983 | Germany . |
| 0309587 | 4/1989 | Germany . |
| 568888 | 4/1945 | United Kingdom . |
| 9100371 | 1/1991 | WIPO . |
| 9119824 | 12/1991 | WIPO . |

OTHER PUBLICATIONS

Patent Abstracts of Japan, vol. 9, No. 282 (M–428) (2005), 9 Nov. 1985, & JP, A, 60124407 (Kubota Tekko K.K.) 3 Jul. 1985.

Patent Abstracts of Japan, vol. 10, No. 218 (M–503) (2274), 30 Jul. 1986, & JP, A, 6156711 (Hitachi Ltd) 22 Mar. 1986.

*Primary Examiner*—Irene Cuda
*Attorney, Agent, or Firm*—Cushman, Darby & Cushman

[57] ABSTRACT

A composite working roll, in particular for a roughing or finishing stand of a hot strip rolling mill, said working roll comprising a core of a metal selected from the group consisting of iron and steel, an outer zone of chromium-vanadium steel and a bonding zone between said core and said outer zone, wherein said steel of said outer zone contains 1.3 to 2.2% by weight carbon, 8 to 16% by weight chromium and 4 to 7% by weight vanadium, the remainder being constituted by iron and other elements which are usually present.

Preferably the steel of the outer zone contains 9 to 14% chromium and 5 to 6,5% vanadium and the vanadium content decreases with increase in the carbon content.

13 Claims, 3 Drawing Sheets

FIG·2

COMPOSITE WORKING ROLL FOR HOT ROLLING FLAT PRODUCTS

This application is a continuation-in-part of application Ser. No. 07/758,492 filed Sep. 5, 1991, abandoned, which was a continuation of application Ser. No. 07/408,517 (now abandoned) the national phase of which was completed Oct. 16, 1989 having been based on PCT/FR88/0063, filed Dec. 21, 1988, which designated the U.S., the content of all of which is incorporated hereinto by reference.

The subject of the present invention is a bimetallic working roll for a rolling mill.

The principal known criteria which the hot working rolls must fulfil are the following:

— the morphology of the carbide phase must be satisfactory, that is, have a sufficient degree of dissociation;

— the oxidation kinetics, in particular in the laminating conditions of the last stand, that is at temperatures of about 500° C., must be sufficient.

— the hot elastic limit must be the highest possible to resist superficial creep and cavities.

French Patent Applications No. 79 27 952 and 86 10 216 (publication Nos. 2469221 and 2601268 published May 22, 1981 and Jan. 15, 1988 respectively) describe constructions of working rolls in which it has been attempted to incorporate these various criteria by a judicious choice of the content by weight of carbon, of chromium and of molybdenum, so as to adjust the morphology of the eutectic carbides $M_7C_3$ or $Mo_2C$.

German Patent Application DE-A-32 36 268, published Jun. 1, 1983, mentions a composition particularly resistant to wear and to thermal fatigue using vanadium as the carbide-forming element.

The compositions mentioned therein are foreseen to be used in the form of statically cast (poured) solid-forged rings and mechanically mounted on a shaft in view of their use for hot rolling of threads.

This solution cannot technically and economically be used for rolling flat products which require large-sized rolls of which the diameter is between 600 and 1200 mm and of which the platen length is between 1500 and 4500 mm.

A working roll for the production of flat products is subjected to very great pressures, which can reach 1000 tons/meter of platen, and consequently it must have a resilient core, only slightly deformable, not having any crystallisation fault, and which is also capable of resisting the internal tensions brought about by the presence of the platen metal which surrounds the core, of which the function is to resist wear and thermal fatigue.

Due to the existence of internal tension phenomena, and in particular the constraint of radial traction, the bond between the envelope metal and the core metal must be perfect and must not have cavities nor carbide segregations which would weaken it. Such faults are not admissible because they risk bringing about, during use, the separation of the two metals with very significant economic consequences in the case of a rolling mill working for example at more than 1000 m/minute.

For the constitution of the core, the most useful metal currently used is nodular cast-iron. When the envelope metals are highly alloyed, only the technology of centrifugal casting, and in particular that of vertical axis centrifugal casting, enables a perfect bond between the core and the envelope metal to be obtained.

Until now alloys with a high vanadium content could not be used in combination with nodular cast-iron due to a distinctive feature of theirs which is due to a specific characteristic of vanadium carbide.

In effect, vanadium carbide is lighter than the liquid from which it is derived. This characteristic is well known for hypereutectic alloys for which crystallization begins with the carbide $VC_{1-x}$ of which the density is 5.5, and is therefore lower than that of the liquid of which the density is about 7.5.

The parts manufactured from these alloys have, systematically, a concentration of primary carbide $VC_{1-x}$ in the casting heat.

However, when alloys are used of which the initial composition is situated in the gamma loop of the vanadium/carbon diagram, there is theoretically no longer any formation of primary carbide of VC type and the crystallization path takes the following sequences:

liquid→γ→γ+ VC) eutectic→ γ+ VC+ $M_x C_y$.

As the VC eutectic carbide forms in an already greatly consolidated austenite, it can no longer be displaced under the effect of gravitational and centrifugal forces, therefore there is no further segregation.

This simple theoretical scheme does not take account of minor segregation, and the carbon- and vanadium-enriched liquid layers which are found in the interdendritic groove can therefore directly give rise to $VC_{1-x}$ primary carbides which the centripetal force instantly drive towards the internal wall. Thus, centrifugal casting considerably aggravates the phenomenon of segregation and this has two major consequences for the bimetallic combination necessary for the manufacture of a continuous mill roll.

First of all, the segregated VC primary carbides form a layer extremely rich in vanadium, of which the content can be as much as 15%, of which the solidus is very high and in any case higher than that of the base metal. The consequence of this is to cause an interruption in the normally continuous renourishment of the liquid retreat by the casting heads and it results in numerous microporosities which make the layers affected by this phenomenon unfit for rolling.

Finally, the very high vanadium content of the internal wall and its high solidus temperature cause, in the bonding area, the dense formation of carbides of M3C type which weaken the bond and can lead to the violent separation of the two metals under the combined effect of internal tensions and mechanical and thermal rolling forces.

In order to remedy the above-mentioned inconveniences mentioned, one object of the invention is to provide a composite bimetallic working roll characterized in that the external working envelope is constituted by an alloy containing iron, carbon, vanadium, chromium and molybdenum, the domain of composition of the alloy represented in a carbon-vanadium diagram, being defined by a quadrilateral of which the sides are:

a) the line of constant ordinate V=3% by weight;
b) the line of constant abscissa C=3% by weight;
c) the peritectic line separating the domains of the δ and γ phases; and
d) a straight line determining the maximum admissible vanadium content passing through two points of respective coordinates C=1.8%–V=6%, and C=3%–V =4,5%;

and in that the core of the roll is of nodular cast-iron.

The wearing modes of hot working rolls are multiple and essentially depend on the temperature of the rolled product and therefore on the position of the roll in the mill.

The well-known incrustation mechanism (banding), which has for origin the breaking up and loosening of carbides on the working surface of the rolls, occurs on the last roughing stands and on the first finishing stands.

The friction and sliding between the metal of the strip and the roll, which varies according to the place along the arc of contact and according to the rolling conditions (pressure, temperature), may result in a plastic surface shearing which, in the presence of an insufficient and/or insufficiently tenacious layer of oxide, is characterized by continuous binding working conditions.

The negative manifestations of these continuous binding conditions are the formation on the surface of the roll of a relief in the shape of chevrons (termed "creep" by some specialists) which is no other than a limit form of the flow of the oxide and, after this, the appearance of a catastrophic adhesive wear phenomenon: sticking.

Both, in the same way as the banding, have adverse effects on the efficiency of the roll, expressed as tons of rolled product per worn millimeter, and result in rejects or downgradings of the rolled product.

French patent No. 79 27952 already describes interesting solutions which resulted in a considerable industrial development in many hot rolling mills by considerably improving the resistance to the breaking up of the carbides of the working surface and to thermal fatigue by adjusting the morphology and the quantity of the $M_7 C_3$ carbides by a judicious choice of the carbon and chromium contents.

However, the $M_7 C_3$ carbide created on the chromium element gives a matrix rich in chromium which, in the absence of another compensating element, results in low oxidation kinetics, in particular when the temperature of the strip decreases, which is the case in the finishing stands.

Now, in particular when the temperature decreases, the scale of the rolled material has a plastic deformation capability which if often insufficient to ensure a uniform covering of the sheet in the nip (gap between the rolls), and metal-roll contacts may occur where the metal is bared, if the roll is not itself covered with a layer of oxide. Sticking, or at least a microsticking, then becomes inevitable.

The oxidation kinetics is improved by employing a high vanadium content to permit formation of VC carbides having an excellent morphology. Rolls produced according to this concept have an extraordinary wear resistance in all the last finishing stands. This same concept employed in the first finishing stands on the other hand appears to be quite insufficient and the layers of oxides formed on the surface of these rolls, even in favourable thermic conditions, are three to four times thinner than those obtained with rolls of cast iron having a high chromium content.

Such layers of oxides are too fragile and easily flake, which results, as before, in risks of sticking or microsticking.

Accordingly another object of the invention is to provide a composite working roll for a roughing stand or finishing stand of a hot strip mill which has improved characteristics and performances in the envisaged particular utilizations, by a simultaneous improvement in the oxidation kinetics and in the adherence of the oxide film.

Further, it should be possible to produce a roll according to the invention by means of the centrifugal casting technique.

The invention therefore provides a composite working roll, in particular for a roughing or finishing stand of a hot strip mill, said roll comprising an iron or steel core, an outer zone of chromium-vanadium steel and a bonding zone between the core and the outer zone, characterized in that the steel of the outer zone contains 1.3 to 2.2% by weight carbon, 8 to 16% by weight chromium and 4 to 7% by weight vanadium, the remainder being constituted by iron and other elements which are usually present.

According to other features of the invention:

— the chromium and vanadium contents are preferably 9 to 14% and 5 to 6.5% respectively;
— the steel of the outer working zone further contains 3 to 5% cobalt;
— the core of the roll is of nodular cast iron;
— the core of the roll is of steel containing 0.3 to 0.5% by weight carbon.

The invention also provides a method for hot rolling metal strips and in particular steel strips in a hot strip mill comprising a plurality of stands at least one of which comprises at least one working roll according to the invention, characterized in that, with θ (in ° C.) being the rolling temperature in a given stand of the mill, there is employed in said stand at least one roll in which the content of chromium $Cr_m$ of the matrix of the outer zone substantially satisfies the relation:

$$Cr_m = \frac{\theta - 610}{40}$$

Further, the content of chromium $Cr_m$ of the matrix substantially satisfies the following relation:

$$Cr_m = 1,631 \frac{Cr}{C} - 0.83$$

The invention also covers the utilization in a roughing stand or a finishing stand of a hot strip mill of a roll such as that defined hereinbefore.

The invention will now be described in more detail with reference to the accompanying drawing which is given solely as an example and in which.

In line with the invention a study of the diagram of the constitution of iron-carbon-vanadium alloys, (FIG. 1) and in particular compositions situated in the γ loop of this diagram, have enabled a specific domain of compositions to be made evident in which the alloys have several of the following properties:

— presence of the dissociated eutectic;
— ability of the matrix to be oxidized;
— hardness of high heat; and
— absence of segregation of VC carbide.

Figure 1:
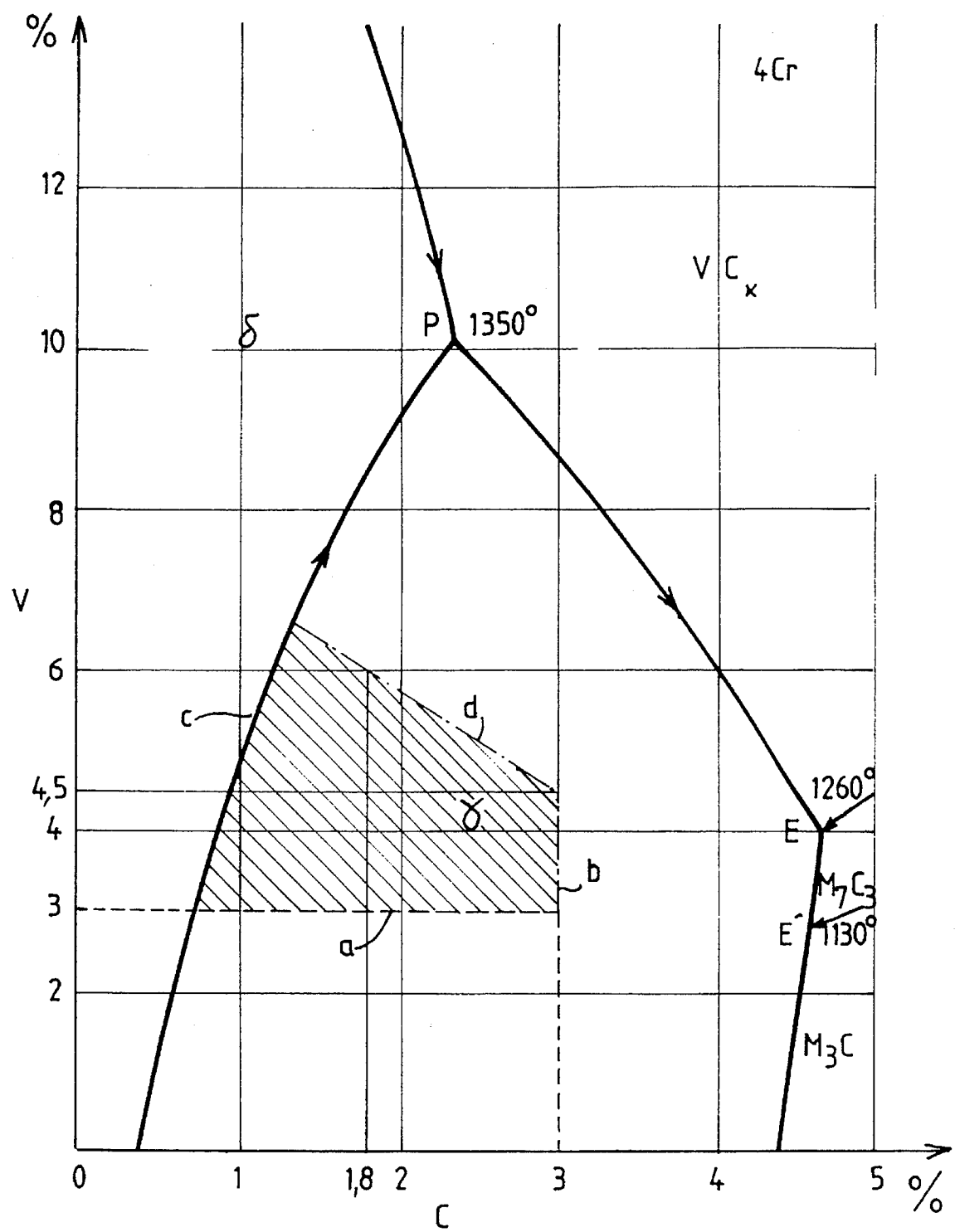
FIG. 1 shows part of a carbon-vanadium diagram.

The domain of composition of the alloy, cast-iron or steel, conforming to the invention which has just been defined, is represented by a shaded area in FIG. 1 of the drawing attached to the present application.

The γ-VC eutectic is particularly well dissociated and even leads to the obtaining of carbides which are rounded in form and which have a maximum resistance to breakages and to micro-scaling. This eutectic, which is situated, for the most carburized compositions, inside the network $M_7 C_3$, considerably reinforces the resistance of the matrix to wear.

For the least carburized compositions, this eutectic is transferred to the γ grain junctions but always with rounded and well dissociated forms.

The γ-$M_7 C_3$ and γ-$M_2C$ eutectics are also dissociated. On the contrary the γ-$M_3C$ eutectic, which is only slightly dissociated, is fragile and has a size which facilitates the well known phenomenon of banding. For this reason, in accordance with the invention, it is important that in addition to a certain minimum chromium content of between 2 and 5% by weight, necessary for the formation of the $M_7 C_3$ eutectic, the vanadium content should be greater than 3%. The chromium content chosen enables the matrix to be well oxidized.

Tests carried out using a mini-centrifuge, able to work with accelerations of 150 g., enabled the "critical" vanadium for various carbon contents to be defined, that is, the maximum admissible vanadium content in the composition of the iron-carbon-vanadium diagram in which the competition between the increase in austenite and the enrichment in vanadium of the interdentritic groove prevents the formation of the primary carbide $VC_{1-x}$.

Thus for carbon contents of about 1%, the vanadium maximum of 5% does not lead to segregation. A higher content would lead in any case into the δ domain which must be avoided if it is desired to obtain a sufficient toughness when hot.

It is also not desirable to exceed a content greater than 3% by weight of carbon, in order to avoid a great decrease in the quantity of γ-VC eutectics in favour of the γ $M_3C$ eutectic which then loses its dissociated character.

Alloy elements must be added to the basic composition of the high vanadium steel or cast-iron alloy, without modifying the eutectic structure, or increasing the temperature of the point A1 in order to obtain quenchability in the domain considered, resistance to oxidation and mechanical characteristics after tempering.

It is thus necessary to limit to 3% by weight the molybdenum content of the alloy which improves the quenching aptitude and enables a greater hardness to be obtained when hot, but which tends to cause the formation of a γ-$Mo_2C$ eutectic.

Also the silicon content of the alloy must be limited to 1% by weight which improves the alloy's resistance to oxidation but which tends to give it a eutectic structure in "chinese writing" and which lessens its quenching aptitude.

In the same way, in order to avoid the excessive formation of γ-$M_7C_3$ eutectic as well as an excessive resistance to oxidation, the chromium content, which is added for its favourable influence on the quenching aptitude, must be limited to 5%.

The embodiments of working rolls will now be described, which conform to the teachings of the invention.

EXAMPLE 1

This first example relates to a working roll used in the first finishing stands ($F_1$–$F_4$) in which banding is the most serious form of wear.

It relates to the creation of a working roll of 745 mm diameter and of 2040 mm platen length.

Due to the most important criterion of maintaining the condition of the surface, a minimum primary carbide content is used in this example, that is, less than 10%. The composition of the envelope metal is as follows:
C=0.98; Si=0.96; Mn=0.90; P=0.024;
S=0.016; Ni=1.01; Cr=5.22; Mo=1;
V=4.23; and Cu=1.98.

The composition of the core metal is as follows:
C=2.92; Si=2.65; Mn=0.35; S=0,008;
P=0.040; Cr=0.12; Ni=0.53; and Mg=0.065.

The roll is made by the technique of vertical axis centrifugal casting. No segregation of VC carbide is visible at the bond of the two metals. Due to the great liability of alloys with a high vanadium content to be oxidized at high temperature, and the high quenching temperatures required, a double subcritical treatment was carried out at 500° C., which enables a final hardness to be obtained of between 78 and 82 ShC and a residual austenite content of less than 10%.

The choice of the elements of the alloy was made according to the following criteria:

Carbon: it determines essentially the proportion of eutectic carbides of VC type. In the example considered the minimum amount is chosen, that is, at the limit of the formation of δ ferrites, and for a VC carbide content of about 5%, corresponding to a maximum degree of dissociation. For the application considered, it is recommended for the VC carbide content not to exceed 15%.

Silicon: it is limited to 1% due to the tendency to arrange the VC eutectic carbides in "chinese writing", but it must be at least 0,5% because of its deoxidizing role.

Manganese: it is at least 0.6% because of its deoxidizing role, but limited to 2%. It is preferable to use the gammagenic effect of copper and nickel, to avoid the formation of both δ ferrite and of perlite. A higher manganese content would have an unfavourable effect on the morphology of the carbides.

Nickel and copper: both are used as gammagenic elements. They enable the formation of perlite to be avoided in the crude casting state, which then permits subcritical treatment. The total content in copper plus nickel is about 3.5% for a roll with an 800 mm diameter. It would be 4.5% for a 1100 mm diameter and 2.5% for a 500 mm diameter.

Copper is preferred to nickel because it has no influence on the morphology of the VC eutectic carbide.

Molybdenum: it also has an influence on the formation of perlite, which it avoids while improving the heat-resistance. Its content is limited to 3% in order to avoid the formation of $Mo_2C$ eutectic, which is particularly fragile.

Chromium: it is at its upper limit of 5% because the first stands are relatively hot and must therefore be protected against oxidation.

In a simulated wear test, this new type of composition of the envelope material enabled wear to be reduced, from 5 microns (traditional cast-iron rolls with a high chromium content) to 1.2 microns, for stand F1; and for stand $F_4$ from 10 microns to 1.8 microns. The condition of the laminating surface obtained is of a remarkable quality and its wear is very slight. The improvement thus obtained is therefore particularly important.

EXAMPLE 2

This second example relates to the creation of a working roll for the final finishing stands ($F_5$–$F_7$) in which the wear essentially results in a loss of profile. It relates to the creation of a working roll with a 775 mm diameter and 2 286 mm platen length.

Due to the priority given here to the maintenance of the profile, a high eutectic carbide content is sought by this composition, that is, greater than 20%.

The composition of the envelope metal is as follows:
C=2.51; Si=0.88; Mn=1.22; S=0.016;
P=0.050; Cr=3.61; Ni=1.60; Mo=2.08;
V=4.00; and Cu=2.00.

The composition of the core metal is as follows:
C=3.02; Si=2.55; Mn=0.40; S=0,008;
P=0.032; Cr=0.08; Ni=0,47; and Mg=0.055.

The working roll is also made by vertical axis centrifugal casting. No segregation of VC carbide is visible at the bond between the two metals. As previously, the roll is submitted to a double treatment of subcritical quenching at 510° C., which enables a final hardness to be obtained of between 80 and 85 ShC and a residual austenite content of about 10%.

The choice of the contents of the various elements of the alloy of the envelope material is made according to the same criteria as those set out in the first example, with the exception of carbon, which here is chosen to obtain a greater quantity of VC and M7C3 carbide.

The chromium content is chosen close to its lower limit, in order to facilitate the formation of the oxide film which has some difficulty forming in stand F7, due to a quite low roll/plate contact temperature (450° C.).

In a simulated wear test, this new type of roll material for a continuous rolling mill train reduces the wear at stand F5 from 12 microns to 3.5 microns and at stand F7 from 6 microns to 4 microns, the comparison being made with the traditional grade of cast-iron with indefinite quenching. The improvement of the rolling quality is particularly significant and this is so notably at stand F5.

In the prior art previously analysed, and related more particularly with working rolls in roughing stands and finishing stands, it appears that the layer of oxide formed by the material of the roll in the presence of steam and under given temperature conditions is determinant as concerns the sticking phenomenon.

This layer of oxide must be rapidly formed so as to be renewed as it is worn away by the friction-sliding with the scale of the rolled product, but it must also be very adherent to the support so as to maintain, notwithstanding the variable rolling conditions in the course of a given operation, a thickness which is always sufficient and thereby avoid the chevrons of the limit layer.

In this respect, it has appeared in tests carried out in the laboratory on a hot friction machine that the best coefficient of friction presenting in addition the best stability, is obtained with chromium spinels. This coefficient of friction moreover increases with increase in the quantity of oxide formed and increase in the chromium contained in the spinel $(Cr_x Fe_y)_z O_4$.

This is quite in correlation with the observation in practice of the best slipping behaviour of the rolls produced in accordance with the teaching of French patent No. 79 27952 relative to those of the prior art (rolls forged from adamire steel).

All these tests have led, in accordance with the invention, to the combination of the chromium and vanadium elements by optimizing each of the elements so as to improve both the oxidation kinetics due to the vanadium element and the adherence of the oxide film due to the chromium element.

In order to conserve the morphology of the chromium carbides already obtained by the French patent No. 79 27952, the content of the $M_7 C_3$ carbides must be between 3 and 15%, which results in a carbon content between 1.3 and 2.2% and a chromium content between 8 and 16%.

As explained hereabove the "critical vanadium" line defines, for a given carbon content, a vanadium content not to be exceeded in order to avoid immediately creating a zone of decantation of the VC carbide automatically resulting in a connection zone which is both porous and fragile between the core of the roll and its outer zone or case.

Figure 2:
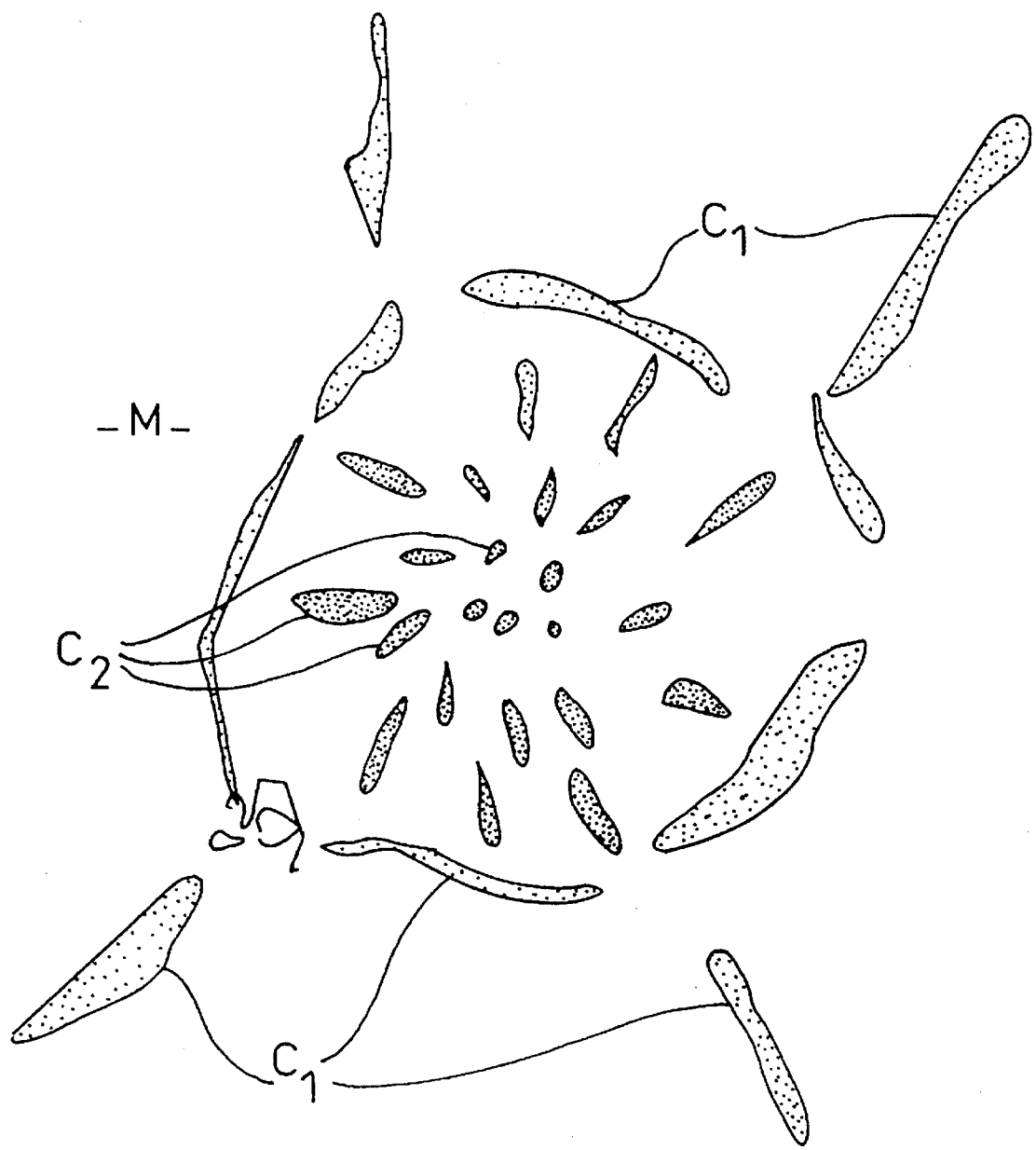
FIG. 2 is a diagrammatic view of a micrographic section illustrating the structure of the outer working zone of a roll according to the invention.

On the other hand, the VC carbide of the γVC eutectic which is formed well before the $M_7 C_3$ eutectic is finally in the form of elongated elements or "needles" disposed in an intergranular position relative to the $M_7 C_3$ eutectic, thereby providing between the $M_7 C_3$ carbides an "urchin"-like structure. This arrangement is diagrammatically illustrated in FIG. 2. There are shown in the latter, embedded in the matrix M of the steel constituting the outer zone of the roll, $C_1$ carbides of type $M_7 C_3$ and $C_2$ carbides of type VC. The variation in the shape of the VC carbides as shown in this diagram corresponds to the previously mentioned "urchin"-like structure.

The vanadium content of the roll according to the invention is thus between 5 and 7% and varies in accordance with the carbon content, this vanadium content being the lower as the carbon content is higher. Such a vanadium content permits the use of a centrifugal casting manufacturing method.

Under these conditions, the VC carbide contents, measured by means of a scanning electronic microscope, are between 4 and 5% in volume.

This γVC eutectic has been found in service to have an extreme wear resistance, no doubt due to both the hardness of the VC carbide (3000 HV) and its tribological properties manifested by the instantaneous formation of vanadium oxide.

Further, the chromium of the matrix, which is capable of producing the desired chromium spinel, has a content which varies between about 6 and 13%, and, upon crystallisation, there are formed exclusively two eutectics, namely that of the chromium and that of the vanadium, but no $M_3C$ carbide which is in any case to be avoided.

In some cases and in particular for rolling stainless steel where a very high adherence of the oxide film is required, the latter may be still further improved by employing the cobalt element up to a content of 5%.

The use of the other usual elements such as W, Nb, Ti, Zr, B, Mo in variable quantities is possible but that does not fundamentally change the required tribological properties obtained by the invention. In any case, the total content of these various elements must not exceed 10%.

It is also possible within the scope of the invention, to choose in an optimum manner the composition of the metal of the case of a working roll in accordance with the position of this roll in the mill and in accordance with the rolling temperature in the stand to which this roll belongs. A steel having a lower carbon content is used for the roughing stands and a steel having a higher carbon content for the finishing stands. For example, the following will preferably be chosen C=1.3 to 1.5% for the roughing stands, C=1.6 to 1.9% for the first finishing stands $F_1$–$F_4$ and C=1.9 to 2.2% for the last finishing stands $F_5$–$F_7$.

The choice of the chromium content permits a relatively precise adaptation in accordance with the position of the stand and the rolling conditions prevailing in this position. Indeed, when the chromium content in the matrix varies between 6 and 13%, the oxidation kinetics vary in a ratio of 3 to 1.

Bearing in mind that the rolling temperature may be of the order of 1,050° to 1,150° C. in the roughing stands, and that this temperature is between about 880 and about 1,020° C. for the first finishing stands, reaching about 850° C. for the last finishing stands, the chromium content of the outer zone of the roll will be determined as a function of the rolling temperature θ expressed in ° C., from the following formulae:

$$Cr_m = \frac{\theta - 610}{40}$$

and $$Cr_m = 1.631 \frac{Cr}{C} - 0.83$$

where $Cr_m$ in the chromium content of the matrix, expressed as a percentage by weight, of the steel constituting the outer zone of the roll.

The second formula applies to the high-chromium alloys and was experimentally checked for the chromium-vanadium alloys concerned in this patent.

With the carbon and chromium contents thus fixed, the vanadium content is so determined as to be in the neighbourhood of the previously-defined line, termed "critical vanadium" line which is substantially a straight line extending, in a vanadium/carbon diagram, between the points C=1.3, V=7 and C=2.2, V=5.

It can therefore be seen from the foregoing that it is possible to produce mill rolls which are suitable for use in each of the stands of a hot strip mill, with a suitable adaptation of the contents of the C, Cr and V elements.

As an example, rolls of this type having the following mean composition were successfully tested in the first finishing stands of a hot strip mill:

C: 1.72
Si: 0.85
Mn: 0.78
P: 0.030
S: 0.014
Ni: 0.79
Cr: 9.25
Mo: 1.82
V: 6.3
W: 0.62

These rolls comprise a core made either from nodular cast iron or from a steel containing 0.3 to 0.5% by weight carbon.

Figure 3:
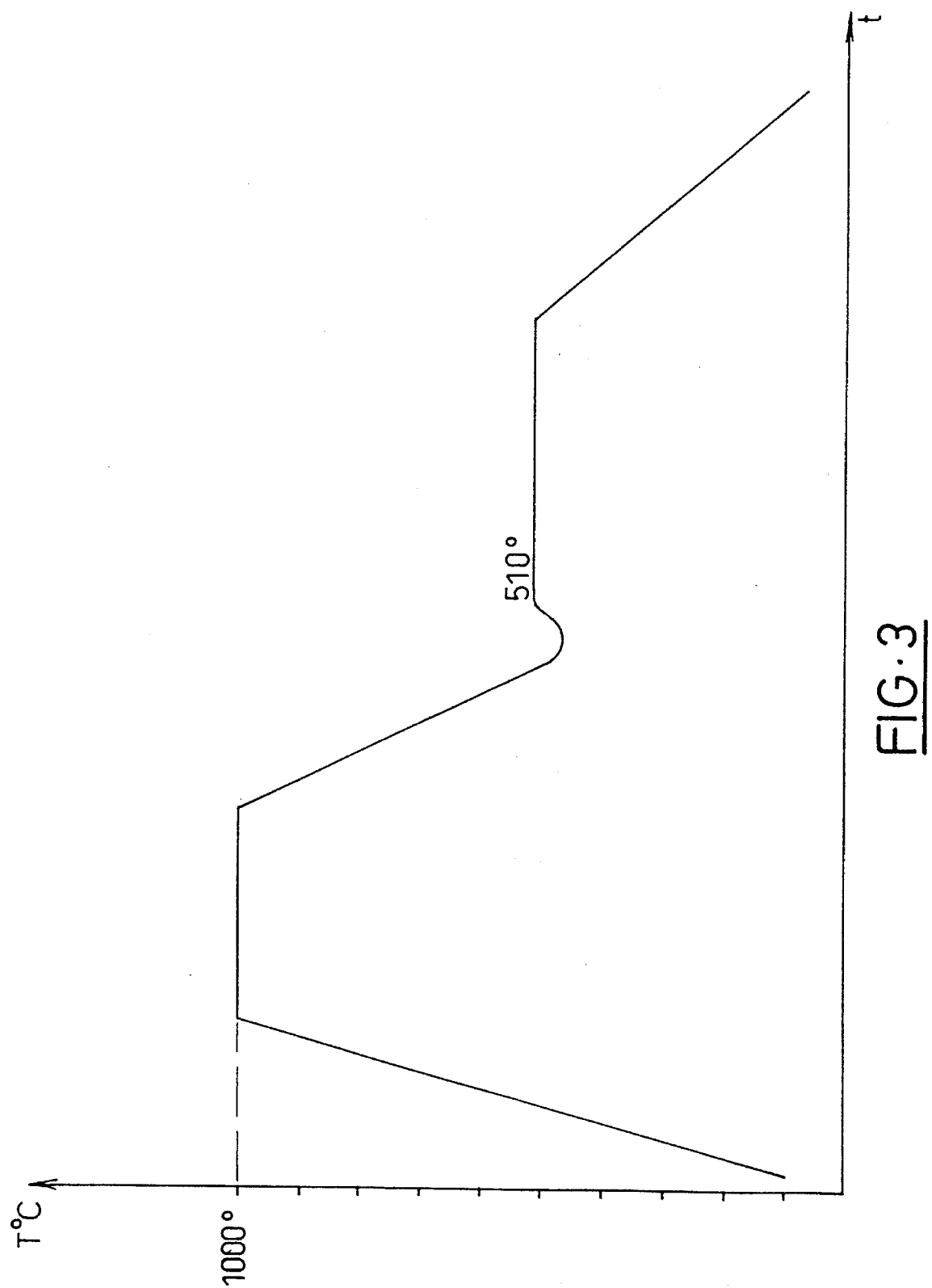
FIG. 3 is a diagram illustrating a heat treatment which may be applied to such a roll.

Rolls according to the invention employed in hot rolling installations have a hardness which exceeds 80 SHC. These rolls are preferably obtained by centrifugal casting and are subjected to a heat treatment which is on the whole conventional and comprises the following steps (FIG. 3):

first of all, an austenitization treatment at a temperature between 950° and 1,050° C. for a period of the order of 24 hours, this temperature and this period depending on the diameter of the roll;

this austenitization is followed by cooling in blown air for a period of about 3 hours so as to reach a temperature of the order of 450° C.;

then the roll is maintained at a constant temperature of the order of about 510° C. for a period of between 6 and 24 hours, depending on the dimension of the roll;

the roll is then cooled in the furnace down to ambient temperature.

Depending on the residual austenite content, the roll is then subjected in the known manner to two or three tempering treatments at a temperature between 450° and 500° C.

What is claimed is:

1. A composite working roll, in particular for a roughing or finishing stud of a hot strip rolling mill, said working roll comprising:

a core of a metal selected from the group consisting of iron and steel, an outer zone of chromium-vanadium steel and a bonding zone between said core and said outer zone, wherein said steel of said outer zone contains 1.3 to 2.2% by weight carbon, 8 to 16% by weight chromium and 4 to 7% by weight vanadium, the remainder being constituted by iron and other elements which are usually present, and wherein said steel of said outer zone contains 3 to 5% by weight cobalt.

2. A roll according to claim 1, wherein said steel of said outer zone contains 9 to 14% chromium and 5 to 6.5% vanadium.

3. A roll according to claim 1, wherein said steel of said outer zone contains alloy elements selected from the group consisting of W, Nb, Ti, Zr, B, Mo, said alloy elements together having a total content of less than 10% by weight.

4. A roll according to claim 1, wherein said vanadium content decreases with increase in said carbon content.

5. A roll according to claim 1, wherein said core of said roll is of nodular cast iron.

6. A roll according to claim 1, wherein said core of said roll is of nodular cast iron.

7. A roll according to claim 1, made by centrifugal casting.

8. A composite working roll, in particular for a roughing or finishing stand of a hot strip rolling mill, said working roll comprising:

a core of a metal selected from the group consisting of iron and steel, an outer zone of chromium-vanadium steel and a bonding zone between said core and said outer zone, wherein said steel of said outer zone contains 1.3 to 2.2% by weight carbon, 8 to 16% by weight chromium and 4 to 7% by weight vanadium, the remainder being constituted by iron and other elements which are usually present, and wherein said vanadium content decreases with increase in said carbon content, and wherein, in a C, V diagram, points representing said contents of vanadium and carbon are located on a segment of a straight line determined by points C=1.3%, v=7% and C=2.2%, V=5%.

9. A roll according to claim 8, wherein said steel of said outer zone contains alloy elements selected from the group consisting of W, Nb, Ti, Zr, B, Mo, said alloy elements together having a total content of less than 10% by weight.

10. A composite working roll, in particular for a roughing or finishing stand of a hot strip rolling mill, said working roll comprising:

a core of a metal selected from the group consisting or iron and steel, an outer zone of chromium-vanadium steel and a bonding zone between said core and said outer zone, wherein said steel of said outer zone contains 1.3 to 2.2% by weight carbon, 8 to 16% by weight chromium and 4 to 7% by weight vanadium, the remainder being constituted by iron and other elements which are usually present, and wherein said vanadium content decreases with increase in said carbon content, and wherein, in a C, V diagram, points representing said contents of vanadium and carbon are located in the vicinity of a segment of a straight line determined by points C=1.3%, V=7% and C=2.2%, V=5%.

11. A roll according to claim 10, wherein said steel of said outer zone contains alloy elements selected from the group consisting of W, Nb, Ti, Zr, B, Mo, said alloy elements together having a total content of less than 10% by weight.

12. A composite working roll, in particular for a roughing or finishing stand of a hot strip rolling mill, said working roll comprising:

a core of a metal selected from the group consisting or iron and steel, an outer zone of chromium-vanadium steel and a bonding zone between said core and said outer zone, wherein said steel of said outer zone contains 1.3 to 2.2% by weight carbon, 8 to 16 by weight chromium and 4 to 7% by weight vanadium, the remainder being constituted by iron and other elements which are usually present, and wherein said outer zone has a content of $M_7C_3$ carbides which is between 3 and 15% and γVC eutectic elongated elements disposed in an intragranular position relative-to the $M_7C_3$ carbides, thereby providing an urchin-shaped structure between said $M_7C_3$ carbides.

13. A roll according to claim 12, wherein said steel of said outer zone contains alloy elements selected from the group consisting of W, Nb, Ti, Zr, B, Mo, said alloy elements together having a total content of less than 10% by weight.

* * * * *

UNITED STATES PATENT AND TRADEMARK OFFICE
CERTIFICATE OF CORRECTION

PATENT NO.      : 5,536,230
DATED           : July 16, 1996
INVENTOR(S)     : WERQUIN et al.

It is certified that error appears in the above-identified patent and that said Letters Patent is hereby corrected as shown below:

On title page,

In Item 63 should read --Continuation-in-part of Ser. No. 758,492, Sep. 5, 1991, abandoned, which was a continuation of Ser. No. 408,517, Oct. 16, 1989, abandoned, which was the National Stage of International Application No. PCT/FR88/00631, filed Dec. 21, 1988.--.

Signed and Sealed this

Seventeenth Day of June, 1997

Attest:

BRUCE LEHMAN

*Attesting Officer*   *Commissioner of Patents and Trademarks*